United States Patent
Kurata et al.

(10) Patent No.: US 12,394,796 B2
(45) Date of Patent: Aug. 19, 2025

(54) COPOLYMER FOR BINDER FOR NON-AQUEOUS BATTERY ELECTRODE, AND SLURRY FOR PRODUCING NON-AQUEOUS BATTERY ELECTRODE

(71) Applicant: SHOWA DENKO K.K., Tokyo (JP)

(72) Inventors: Tomonori Kurata, Kawasaki (JP); Shuhei Maruta, Yokohama (JP); Kirida Kunanuruksapong, Himeji (JP); Mitsuru Hanasaki, Himeji (JP)

(73) Assignee: Resonac Corporation, Tokyo (JP)

( * ) Notice: Subject to any disclaimer, the term of this patent is extended or adjusted under 35 U.S.C. 154(b) by 1226 days.

(21) Appl. No.: 17/260,440

(22) PCT Filed: Jul. 12, 2019

(86) PCT No.: PCT/JP2019/027630
§ 371 (c)(1),
(2) Date: Jan. 14, 2021

(87) PCT Pub. No.: WO2020/017442
PCT Pub. Date: Jan. 23, 2020

(65) Prior Publication Data
US 2021/0296651 A1   Sep. 23, 2021

(30) Foreign Application Priority Data
Jul. 19, 2018   (JP) .................... 2018-136249

(51) Int. Cl.
| | |
|---|---|
| H01M 4/62 | (2006.01) |
| C08F 290/06 | (2006.01) |
| H01M 4/13 | (2010.01) |
| H01M 10/05 | (2010.01) |
| H01M 10/0525 | (2010.01) |
| H01M 4/02 | (2006.01) |

(52) U.S. Cl.
CPC ......... *H01M 4/622* (2013.01); *C08F 290/062* (2013.01); *H01M 4/13* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 6,296,698 B1 | 10/2001 | Naramoto et al. |
| 2019/0058195 A1 | 2/2019 | Hanasaki et al. |

FOREIGN PATENT DOCUMENTS

| | | |
|---|---|---|
| CN | 101492596 A | 7/2009 |
| CN | 107496978 A | 12/2017 |
| EP | 2787564 A1 | 10/2014 |
| JP | 08-250123 A | 9/1996 |
| JP | 09-054428 A | 2/1997 |
| JP | 10-298386 A | 11/1998 |
| JP | 11-323334 A | 11/1999 |
| JP | 2000-001352 A | 1/2000 |
| JP | 2000001352 * | 1/2000 ............. C04B 24/26 |
| JP | 2001146508 * | 5/2001 |
| JP | 2002-279980 A | 9/2002 |
| JP | 2005-336166 A | 12/2005 |
| JP | 2006-321792 A | 11/2006 |
| JP | 2011-124039 A | 6/2011 |

(Continued)

OTHER PUBLICATIONS

Extended European Search Report dated May 11, 2022 in Application No. 19837813.5.

(Continued)

*Primary Examiner* — Barbara L Gilliam
*Assistant Examiner* — Angela J Martin
(74) *Attorney, Agent, or Firm* — Sughrue Mion, PLLC

(57) ABSTRACT

The present invention relates to a copolymer for a binder for a non-aqueous battery electrode, which ensures sufficient binding properties between active materials and between the active materials and a current collector, suppresses generation of aggregates in a slurry containing the electrode active material, suppresses generation of cracks in an electrode active material layer, and sufficiently ensures peel strength of the electrode active material layer against the current collector. The copolymer for a binder for a non-aqueous battery electrode is a copolymer (P) of a monomer mixture (M) containing a monomer (A) represented by general formula (1), a (meth)acrylic acid monomer (B), and a monomer (C) represented by general formula (2), wherein a content of a structure derived from the monomer (A) in the copolymer (P) is 0.5 to 20.0 mass % and a content of a structure derived from the monomer (C) in the copolymer (P) is 0.5 to 20.0 mass %.

[Chemical Formula 1]

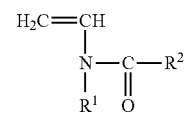

(1)

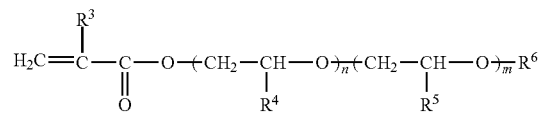

(2)

13 Claims, No Drawings

(56) References Cited

FOREIGN PATENT DOCUMENTS

| JP | 2011124039 | * | 6/2011 | ........ H01M 10/0567 |
|---|---|---|---|---|
| JP | 2015-170392 A | | 9/2015 | |
| JP | 2015170392 | * | 9/2015 | ............. Y02E 60/10 |
| WO | 2015/046126 A1 | | 4/2015 | |
| WO | 2017/150200 A1 | | 9/2017 | |
| WO | WO 2017150200 | * | 12/2018 | .............. H01M 4/62 |

OTHER PUBLICATIONS

International Search Report for PCT/JP2019/027630 dated Sep. 10, 2019 [PCT/ISA/210].

Jianxin Guo, et al., "Use of Modified Polyethylene Imine and Polyethylene Amine as Fixatives for Efficient Treatment of White Resins", Paper Chemicals, Aug. 31, 2006, vol. 18, No. 4, pp. 36-41 (7 pages total).

C. Chappell, Jr., et al., "Amine Functional Specialty Polymers as Adhesives in Multilayer Film Composite Structures", Specialty Monomers and Polymers, Mar. 27, 2000, vol. 14, pp. 186-199 (14 pages total).

\* cited by examiner

COPOLYMER FOR BINDER FOR NON-AQUEOUS BATTERY ELECTRODE, AND SLURRY FOR PRODUCING NON-AQUEOUS BATTERY ELECTRODE

CROSS REFERENCE TO RELATED APPLICATIONS

This application is a National Stage of International Application No. PCT/JP2019/027630 filed Jul. 12, 2019, claiming priority based on Japanese Patent Application No. 2018-136249 filed Jul. 19, 2018.

TECHNICAL FIELD

The present invention relates to a copolymer for a binder for a non-aqueous battery electrode, a slurry for producing a non-aqueous battery electrode, a non-aqueous battery electrode formed by using the slurry for producing a non-aqueous battery electrode, and a non-aqueous battery provided with the non-aqueous battery electrode.

This application claims priority under Japanese Patent Application No. 2018-136249 filed Jul. 19, 2018, the contents of which are incorporated herein by reference.

BACKGROUND TECHNOLOGY

Non-aqueous batteries using non-aqueous electrolytes are superior to aqueous batteries in terms of higher voltage, smaller size, and lighter weight. For this reason, non-aqueous batteries are widely used as power sources for notebook PCs, mobile phones, power tools, and electronic and communications equipment. In recent years, non-aqueous batteries have also been used for electric vehicles and hybrid vehicles from the viewpoint of environmentally friendly vehicle application, but there is a strong demand for higher output, higher capacity, and longer life. As a non-aqueous battery, a lithium ion secondary battery is used as a representative example.

A non-aqueous battery includes a positive electrode using a metal oxide or the like as an active material, a negative electrode using a carbon material such as graphite as an active material, and a non-aqueous electrolyte solution containing mainly carbonates or flame-retardant ionic liquids. The non-aqueous battery is a secondary battery in which the battery is charged and discharged by the movement of ions between the positive electrode and the negative electrode. Specifically, the positive electrode is obtained by coating a slurry comprising a metal oxide and a binder on the surface of a positive electrode current collector such as an aluminum foil, drying the slurry-coating current collector, and cutting it to an appropriate size. The negative electrode is obtained by coating a slurry comprising a carbon material and a binder on the surface of a negative electrode current collector such as a copper foil, drying the slurry-coating current collector and cutting it to an appropriate size.

The binder is used to bind the active material together and to bind the active material with the current collector in the positive electrode and the negative electrode, thereby preventing the active material from being separated from the current collector.

As a binder, a polyvinylidene fluoride (PVDF) binder in which an organic solvent N-methyl-2-pyrrolidone (NMP) is used as a solvent is well known (Patent Document 1).

However, the binder has low binding properties between the active materials and between the active materials and the current collector, and a large amount of binder is required for actual use. Therefore, there is a disadvantage that the capacity of the non-aqueous battery is reduced. In addition, since NMP, which is an expensive organic solvent, is used for a binder, there are also problems in the price of the final product and in the maintenance of the working environment during the preparation of the slurry or the current collector.

As a method for solving these problems, a water-dispersible binder has been conventionally developed, and, for example, a styrene-butadiene rubber (SBR)-based water dispersion in which carboxymethylcellulose (CMC) is used in combination as a thickener is known (Patent Document 2). Since the SBR-based dispersion is an aqueous dispersion, it is inexpensive and advantageous from the viewpoint of conserving the working environment. Further, the active materials and the current collector have relatively good binding properties. Therefore, the electrode can be produced in a smaller amount than that of the PVDF-based binder, and the non-aqueous battery can have a higher output and a higher capacity. Therefore, SBR-based dispersions are widely used as binders for non-aqueous battery electrodes.

However, since the SBR-based binder needs to be used in combination with carboxymethyl cellulose as a thickener, the slurry preparation process is complicated. In addition, when using this binder, there is a problem that the binding properties between the active materials and between the active materials and the current collector are insufficient, and when the electrode is produced with a small amount of binder, a part of the active material is peeled off in the process of cutting the current collector.

Patent Document 3 discloses an adhesive composition for a patch material containing a sodium acrylate-N-vinylacetamide copolymer (copolymerization ratio: sodium acrylate/N-vinylacetamide=40/60 by mass). Patent Document 4 discloses a composition for a hydrous gel containing a sodium acrylate-N-vinylacetamide (55/45 (molar ratio)) copolymer. These sodium acrylate-N-vinylacetamide copolymers contain many components derived from N-vinylacetamide. When such a polymer was mixed with a negative electrode active material (difficult-to-graphitize carbon) and water to form a slurry for producing a non-aqueous battery electrode, aggregates were present in the slurry, and the internal resistance of the battery could not be reduced.

Patent Document 5 discloses a binder for a non-aqueous battery electrode containing a sodium acrylate-N-vinylacetamide copolymer (copolymerization ratio: sodium acrylate/N-vinylacetamide=10/90 by mass). Since the electrode using the polymer has excellent binding properties, a battery having good charge-discharge cycle characteristics can be manufactured.

[Patent Document 1] Japanese Unexamined Patent Application Publication No. H10-298386
[Patent Document 2] Japanese Unexamined Patent Application Publication No. H08-250123
[Patent Document 3] Japanese Unexamined Patent Application Publication No. 2005-336166
[Patent Document 4] Japanese Unexamined Patent Application Publication No. 2006-321792
[Patent Document 5] WO 2017/150200

SUMMARY OF THE INVENTION

Problem to be Solved by the Invention

However, in the binder for a non-aqueous battery electrode disclosed in Patent Document 5, there is a problem that cracks occur in an electrode having a large film thickness, that is, having a large weight per unit area.

An object of the present invention is to provide a copolymer for a binder for a non-aqueous battery electrode, which has sufficient binding properties between active materials and between the active materials and a current collector, suppresses generation of aggregates in a slurry containing the electrode active material, suppresses generation of cracks in an electrode active material layer, and sufficiently ensures peel strength of the electrode active material layer against the current collector. A slurry for producing a non-aqueous battery electrode containing the copolymer for a binder, a non-aqueous battery electrode using the slurry, and a non-aqueous battery are provided.

Means to Solve the Problem

In order to solve the above problem, the present invention is as follows.

[1] A copolymer for a binder for a non-aqueous battery electrode, which is a copolymer (P) of a monomer mixture (M) comprising:
a monomer (A) represented by general formula (1);
a (meth)acrylic acid monomer (B); and
a monomer (C) represented by general formula (2),
wherein a content of a structure derived from the monomer (A) in the copolymer (P) is 0.5 to 20.0 mass % and a content of a structure derived from the monomer (C) in the copolymer (P) is 0.5 to 20.0 mass %,

[Chemical Formula 1]

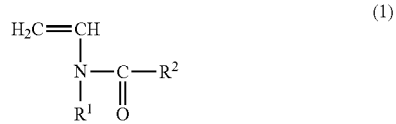

(1)

wherein $R^1$ and $R^2$ each independently represent a hydrogen atom or an alkyl group having 1 to 5 carbon atoms,

[Chemical Formula 2]

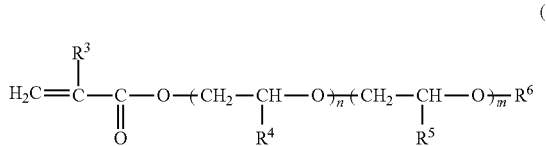

(2)

wherein $R^3$, $R^4$, $R^5$, and $R^6$ each independently represent a hydrogen atom or an alkyl group having 1 to 5 carbon atoms, and n is an integer of 1 or more, m is an integer of 0 or more, and (n+m)≥20.

[2] The copolymer for a binder for a non-aqueous battery electrode according to [1], wherein in the general formula (2), (n+m)≤500.

[3] The copolymer for a binder for a non-aqueous battery electrode according to [1], wherein in the general formula (2), (n+m)≥30.

[4] The copolymer for a binder for a non-aqueous battery electrode according to any one of [1] to [3], wherein the monomer mixture (M) further comprises an ethylenically unsaturated monomer (D) having a polar functional group.

[5] The copolymer for a binder for a non-aqueous battery electrode according to any one of [1] to [4], wherein the monomer (A) is N-vinylformamide or N-vinylacetamide.

[6] The copolymer for a binder for a non-aqueous battery electrode according to any one of [1] to [5], wherein the weight-average molecular weight is in the range of 1,000,000 to 10,000,000.

[7] The copolymer for a binder for a non-aqueous battery electrode according to any one of [4] to [6], wherein a content of a structure derived from the monomer (B) is 60.0 to 98.5 mass % in the copolymer (P).

[8] The copolymer for a binder for a non-aqueous battery electrode according to [4] to [7], wherein a content of a structure derived from the monomer (D) is 0.5 to 60.0 mass % in the copolymer (P).

[9] A slurry for producing a non-aqueous battery electrode, the slurry comprising:
a copolymer for a binder for a non-aqueous battery electrode according to any one of [1] to [8];
an electrode active material; and
an aqueous medium.

[10] The slurry for producing a non-aqueous battery electrode according to [9], wherein the electrode active material is a negative electrode active material.

[11] The slurry for producing a non-aqueous battery electrode according to [9] or [10], wherein a content of the copolymer (P) is 0.1 to 5.0 mass % with respect to total mass of the electrode active material and the copolymer (P).

A non-aqueous battery electrode, comprising:
a current collector; and
an electrode active material layer formed on a surface of the current collector,
wherein the electrode active material layer includes
the copolymer for a binder for a non-aqueous battery electrode according to any one of [1] to [8], and
an electrode active material.

[13] The non-aqueous battery electrode according to [12], wherein the electrode active material is a negative electrode active material.

[14] A non-aqueous battery comprising the non-aqueous battery electrode according to [12] or [13].

Effect of the Invention

According to the present invention, it is possible to provide a copolymer for a binder for a non-aqueous battery electrode, which can ensure sufficient bonding properties between active materials and between the active materials and the current collector, suppress the generation of aggregates in a slurry containing the electrode active material, suppress the generation of cracks in the electrode active material layer, and ensure sufficient peel strength of the electrode active material layer against the current collector. The slurry for producing the non-aqueous battery electrode containing the copolymer for a binder, the non-aqueous battery electrode using the slurry, and the non-aqueous battery can be provided.

DESCRIPTION OF EMBODIMENTS

<1. Copolymer (P) for a Binder for a Non-Aqueous Battery Electrode>

The copolymer (P) for a binder for a non-aqueous battery electrode according to the present embodiment (hereinafter simply referred to as "copolymer (P) for binder" or "copolymer (P)") is used for bonding the electrode active materials to each other and bonding the electrode active materials to the current collector in the electrodes of a non-aqueous battery to be described later. The copolymer (P) for binder according to the present embodiment is a copolymer of a monomer mixture (M) containing at least a monomer (A) represented by general formula (1), a (meth)acrylic acid monomer (B), and a monomer (C) represented by general formula (2). In the copolymer (P), a content of the structure derived from the monomer (A) is 0.5 to 20.0 mass % and a content of the structure derived from the monomer (C) is 0.5 to 20.0 mass %.

In the present invention, the term "(meth)acrylic acid" refers to one or both of methacrylic acid and acrylic acid, the term "(meth)acrylic acid monomer" refers to one or both of methacrylic acid monomers and acrylic acid monomers, and the term "(meth)acrylate" refers to one or both of methacrylate and acrylate. In the present invention, "mass content of a structure derived from each monomer of a copolymer (P) of a monomer mixture (M)" is evaluated by the value of mass content of each monomer contained in the monomer mixture (M).

[Chemical Formula 3]

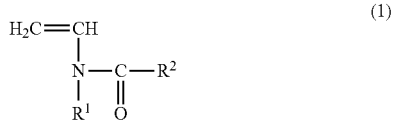

(1)

In formula (1), $R^1$ and $R^2$ each independently represent a hydrogen atom or an alkyl group having 1 to 5 carbon atoms.

[Chemical Formula 4]

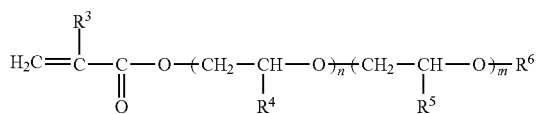

(2)

In formula (2), $R^3$, $R^4$, $R^5$, and $R^6$ each independently represent a hydrogen atom or an alkyl group having 1 to 5 carbon atoms. In the formula, n is an integer of 1 or more, m is an integer of 0 or more, and $(n+m) \geq 20$.

The monomer mixture (M) may further contain an ethylenically unsaturated monomer (D) having a polar functional group.

When the copolymer (P) is synthesized, it is preferable to be polymerized in an aqueous medium. The polymerization may be carried out in an aqueous medium using a radical polymerization initiator. As the polymerization method, for example, a method in which all components used for polymerization are charged at once and polymerized, a method in which each component used for polymerization is polymerized while being continuously supplied, or the like can be used. The polymerization is preferably carried out at a temperature of 30 to 90° C. A specific example of the polymerization method of the copolymer (P) will be described in detail in the following examples.

The weight-average molecular weight of the copolymer (P) is preferably 1,000,000 to 10,000,000, more preferably 1,500,000 to 7,500,000, and still more preferably 2,000,000 to 5,000,000. The weight-average molecular weight is a pullulan-converted value calculated using gel permeation chromatography (GPC).

<1-1. Monomer (A)>
[Chemical Formula 5]

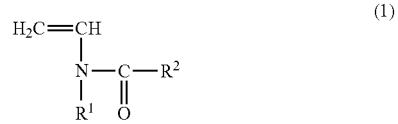

(1)

In formula (1), $R^1$ and $R^2$ each independently represent a hydrogen atom or an alkyl group having 1 to 5 carbon atoms.

In formula (1), $R^1$ and $R^2$ are each independently a hydrogen atom or an alkyl group having 1 to 5 carbon atoms. Preferably, $R^1$ and $R^2$ are each independently a hydrogen atom or an alkyl group having 1 to 3 carbon atoms, and more preferably, $R^1$ and $R^2$ are each independently a hydrogen atom or a methyl group.

Preferred specific examples of the combination of $R^1$ and $R^2$ include $R^1$: H, $R^2$: H (That is, monomer (A) is N-vinylformamide.); and $R^1$: H, $R^2$: $CH_3$ (That is, monomer (A) is N-vinylacetamide.).

In the monomer mixture (M), a content of the monomer (A) is 0.5 to 20.0 mass %, preferably 1.0 to 15.0 mass %, and more preferably 5.0 to 12.5 mass %. When the content of the monomer (A) is 0.5 to 20.0 mass %, a slurry for producing a non-aqueous battery electrode can be produced, wherein in the slurry, an electrode active material and a conductive assistant have excellent dispersibility during producing the slurry for producing a non-aqueous battery electrode and the slurry has good coating properties.

That is, a content of the structure derived from the monomer (A) contained in the copolymer for a binder (P) for a non-aqueous battery electrode according to the present embodiment is 0.5 to 20.0 mass %, preferably 1.0 to 15.0 mass %, and more preferably 5.0 to 12.5 mass %.

<1-2. (Meth)Acrylic Acid Monomer (B)>

The (meth)acrylic acid monomer (B) corresponds to (meth)acrylic acid and/or its salt. In particular, (meth)acrylic acid salt is preferable from the viewpoint of pH adjustment and the like. The (meth)acrylic acid salt is preferably sodium (meth)acrylate, potassium (meth)acrylate, or ammonium (meth)acrylate. Among them, sodium (meth)acrylate and ammonium (meth)acrylate are more preferable, and sodium acrylate is most preferable. The (meth)acrylic acid salt is obtained, for example, by neutralizing (meth)acrylic acid with a hydroxide, ammonia water, or the like, and preferably neutralizing (meth)acrylic acid with sodium hydroxide from the viewpoint of availability.

When the ethylenically unsaturated monomer (D) described later is contained in the monomer mixture (M), a content of the monomer (B) (total content of (meth)acrylic acid and (meth)acrylic acid salt) in the monomer mixture (M) is preferably 20.0 to 99.0 mass %, more preferably 60.0 to 98.5 mass %, and still more preferably 70.0 to 95.0 mass %. When the content of the monomer (B) is 20.0 to 99.0 mass %, it is possible to obtain a non-aqueous battery electrode which has high peel strength and in which an electrode active material and a conductive auxiliary agent have excellent dispersibility in producing a slurry for producing a non-aqueous battery electrode.

That is, the structure derived from the monomer (B) contained in the copolymer for a binder (P) for a non-aqueous battery electrode according to the present embodiment is preferably 20.0 to 99.0 mass %, more preferably 60.0 to 98.5 mass %, and still more preferably 40.0 to 95.0 mass %.

<1-3 Monomer (C)>

[Chemical Formula 6]

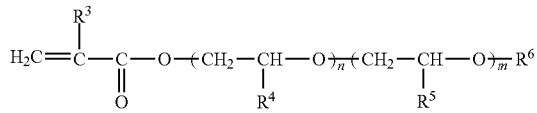

(2)

In formula (2), $R^3$, $R^4$, $R^5$, and $R^6$ each independently represent a hydrogen atom or an alkyl group having 1 to 5 carbon atoms. In the formula, n is an integer of 1 or more, m is an integer of 0 or more, and (n+m)≥20.

The monomer (C) is represented by general formula (2), wherein $R^3$, $R^4$, $R^5$, and $R^6$ each independently represent a hydrogen atom or an alkyl group having 1 to 5 carbon atoms. In the formula, n is an integer of 1 or more, m is an integer of 0 or more, and (n+m)≥20. When (n+m)≥20, generation of cracks in the prepared electrode active material layer can be suppressed.

In formula (2), $R^3$, $R^4$, $R^5$, and $R^6$ are each preferably independently a hydrogen atom or an alkyl group having 1 to 3 carbon atoms, and $R^3$, $R^4$, $R^5$, and $R^6$ are each more preferably a hydrogen atom or a methyl group.

Preferably, (n+m)≥30, and more preferably, (n+m)≥40. Further, preferably (n+m)≤500, more preferably (n+m)≤200, and most preferably (n+m)≤150. When (n+m)≥30, an electrode having better flexibility can be obtained, and when (n+m)≤500, a binder having high adhesive force can be obtained.

Each of n and m represents only the number of the corresponding structural unit in parentheses contained in the molecule of the monomer (C), and the general formula (2) is not limited to a block copolymer. That is, the monomer (C) may be a copolymer in any form such as a random copolymer or a block copolymer, but a random copolymer having a small unevenness in the composition of the molecular chain and low cost is preferable.

Preferred examples of the combination of $R^3$, $R^4$, $R^5$, $R^6$, n, and m in the general formula (2) include the following examples shown in Table 1.

TABLE 1

| No. | $R^3$ | $R^4$ | $R^5$ | $R^6$ | n | m | n + m |
|---|---|---|---|---|---|---|---|
| c1 | H | H | — | Me | 40 to 150 | 0 | 40 to 150 |
| c2 | Me | H | — | Me | 40 to 150 | 0 | 40 to 150 |
| c3 | H | Me | — | Me | 40 to 150 | 0 | 40 to 150 |
| c4 | Me | Me | — | Me | 40 to 150 | 0 | 40 to 150 |
| c5 | H | H | Me | Me | n = m | | 40 to 150 |
| c6 | Me | H | Me | Me | n = 3 m | | 40 to 150 |

In the table, "Me" refers to a methyl group.

Among these examples, it is preferable that m=0 in the general formula (2).

The monomer (C) of m=0 includes, for example, a mono(meth)acrylate of polyethylene glycol such as methoxypolyethylene glycol (meth)acrylate (for example, monomers c1 and c2 in Table 1) and a mono(meth)acrylate of polypropylene glycol such as methoxypolypropylene glycol (meth)acrylate (for example, monomers c3 and c4 in Table 1).

A specific examples of the monomer (C) includes methoxy polyethylene glycol methacrylate (product name VISIOMER (registered trademark) MPEG 2005 MA W, manufactured by EVONIK INDUSTRIES) having $R^3$=$CH_3$, $R^4$=$R^5$=H, $R^6$=$CH_3$, n=45, and m=0 in the general formula (2). Another specific example of the monomer (C) represented by the general formula (2) includes methoxy polyethylene glycol methacrylate (product name VISIOMER (registered trademark) MPEG 5005 MA W, manufactured by EVONIK INDUSTRIES) having $R^3$=$CH_3$, $R^4$=$R^5$=H, $R^6$=$CH_3$, n=113, and m=0.

In the monomer mixture (M), a content of the monomer (C) is 0.5 to 20.0 mass %, preferably 0.5 to 15.0 mass %, and more preferably 1.0 to 10.0 mass %. In particular, when the monomer (C) represented by the general formula (2) in which (n+m)≥40 is used, a content of the monomer (C) is preferably 0.5 to 5.0 mass % in the monomer mixture (M). By using the monomer (C) having a large (n+m) in the general formula (2), a sufficient effect can be exerted even with a smaller content.

That is, a content of the structure derived from the monomer (C) contained in the copolymer for a binder (P) for a non-aqueous battery electrode according to the present embodiment is 0.5 to 20.0 mass %, preferably 0.5 to 15.0 mass %, and more preferably 0.5 to 10.0 mass %. In particular, when the monomer (C) represented by the general formula (2) in which (n+m)≥40, the content of the structure derived from the monomer (C) contained in the copolymer for a binder (P) for a non-aqueous battery electrode according to the present embodiment is preferably 0.5 to 5.0 mass %.

<1-4. Ethylenically Unsaturated Monomer (D)>

The monomer mixture (M) of the present embodiment may further include an ethylenically unsaturated monomer (D) having a polar functional group, other than the monomer (A), the monomer (B), and the monomer (C).

The ethylenically unsaturated monomer (D) may be a compound having at least one polymerizable ethylenically unsaturated bond and having a polar functional group such as a carboxy group, a hydroxy group, an amide group, and a cyano group. Examples of the ethylenically unsaturated monomers having a carboxy group include a half ester of itaconic acid, β-carboxyethyl acrylate, maleic acid, fumaric acid, crotonic acid, and unsaturated dicarboxylic acid. Examples of the ethylenically unsaturated monomers having a hydroxy group include 2-hydroxyethyl (meth)acrylate, 2-hydroxypropyl (meth)acrylate, 4-hydroxybutyl acrylate, 1,4-cyclohexanedimethanol monoacrylate, and the like. Examples of ethylenically unsaturated monomers having an amide group include (meth)acrylamide, N-alkyl (meth)acrylamide, N,N-dialkyl (meth)acrylamide, N-hydroxyalkyl (meth)acrylamide having 1 to 3 carbon atoms in the alkyl group, diaceton (meth)acrylamide, dimethylaminoalkyl (meth)acrylamide having 1 to 5 carbon atoms in the alkyl group except for the dimethylamino group, and (meth) acrylamide-2-methylpropanesulfonic acid. Examples of the cyano group-containing ethylenically unsaturated monomers include (meth)acrylonitrile. Among them, itaconic acid, 2-hydroxyethyl acrylate, 2-hydroxyethyl methacrylate, 4-hydroxybutyl acrylate, and acrylamide are preferable from the viewpoint of availability.

A content of the ethylenically unsaturated monomer (D) in the monomer mixture (M) is preferably 0.5 to 60.0 mass %, more preferably 0.5 to 40.0 mass %, and most preferably 0.5 to 10.0 mass %.

That is, a structure derived from the monomer (D) contained in the copolymer for a binder (P) for the non-aqueous battery electrode according to the present embodiment is preferably 0.5 to 60.0 mass %, more preferably 0.5 to 55.0 mass %, and still more preferably 0.5 to 50.0 mass %.

<1-5. Polymerization Initiators>

Examples of the radical polymerization initiator used in the polymerization include, but are not limited to, ammonium persulfate, potassium persulfate, hydrogen peroxide, t-butyl hydroperoxide, and azo compounds. An example of the azo compound includes 2,2'-azobis(2-methylpropionamidine) dihydrochloride. When the polymerization is carried out in water, a water-soluble polymerization initiator is preferably used. If necessary, a radical polymerization initiator and a reducing agent such as sodium bisulfite, Rongalite or ascorbic acid may be used in combination for redox polymerization.

<1-6. Aqueous Media for Polymerization>

In the present embodiment, water is used as the aqueous medium to be used for polymerization, but as long as the polymerization stability of the resulting copolymer for a binder is not impaired, a hydrophilic solvent may be added to water as the aqueous medium. Examples of the hydrophilic solvent to be added to water include methanol, ethanol, and N-methylpyrrolidone.

<2. Slurry for Producing Non-Aqueous Battery Electrode>

In the slurry for producing a non-aqueous battery electrode (hereinafter simply referred to as "slurry") of this embodiment, a copolymer for a binder (P) is dissolved or dispersed in an aqueous medium, and an electrode active material is dispersed in an aqueous medium. The slurry of the present embodiment may contain a thickener as an optional component, if necessary, but it is preferable not to contain the thickener in order to simplify the slurry preparation process. The order of mixing of the materials in preparing the slurry is not particularly limited as long as the materials are uniformly dissolved and dispersed. The method of preparing the slurry is not particularly limited, but may include, for example, a method of mixing the necessary components using a stirring type mixing apparatus, a rotating type mixing apparatus, or a shaking type mixing apparatus.

A non-volatile content (composed mainly of an electrode active material and a copolymer (P)) in the slurry is preferably 3 to 20 mass %, more preferably 4 to 15 mass %, and still more preferably 5 to 12 mass %. When the non-volatile content is 3 to 20 mass %, it is easy to mix with the electrode active material or the like. The non-volatile content can be adjusted by the amount of the aqueous medium (dispersion medium).

The non-volatile content can be obtained by weighing 1 g of the sample in an aluminum dish having a diameter of 5 cm, drying it at 130° C. for 1 hour under atmospheric pressure while circulating air in a dryer, and weighing the residue.

<2-1. Content of Copolymer (P) for Binder for Non-Aqueous Battery Electrode>

A content of the copolymer for a binder (P) contained in the slurry is preferably 0.1 to 5.0 mass %, more preferably 0.3 to 4.5 mass %, still more preferably 0.5 to 4.0 mass %, and particularly preferably 2.0 to 4.0 mass %, with respect to the total mass of the electrode active material and the copolymer for a binder (P). When the content of the copolymer for a binder (P) is 0.1 to 5.0 mass %, the binding property between the electrode active material and the current collector can be ensured, and the internal resistance of the battery can be reduced.

<2-2. Electrode Active Materials>

The electrode active material may be any material that can be doped or undoped with lithium or the like. When the slurry is used for negative electrode formation, examples of the electrode active material include a conductive polymer, a carbon material, lithium titanate, silicon, and the like. Here, the term "silicon" means a material containing at least one of a silicon single substance and a silicon compound. Examples of the conductive polymers include polyacetylene and polypyrrole. Examples of the carbon materials include coke such as petroleum coke, pitch coke, and coal coke; carbon black such as polymer charcoal, carbon fiber, and acetylene black; and graphite such as artificial graphite and natural graphite. Examples of the silicon include $SiO_x$ ($0.1<x<2.0$), Si, and Si-graphite composite particles. Among these active materials, carbon materials, lithium titanate, silicon, and the like are preferably used in view of the large energy density per volume. Among them, carbon materials such as coke and graphite, and silicones such as $SiO_x$ ($0.1<x<2.0$), Si, and Si-graphite composite particles have a remarkable effect of improving the binding property of the copolymer for a binder (P) of this embodiment. For example, a specific example of artificial graphite is SCMG (registered trademark)-XRs (manufactured by Showa Denko K.K.).

Carbon black, carbon fiber obtained by vapor phase method, or the like may be added to the slurry as the conductive auxiliary. As a specific example of carbon fiber obtained by vapor phase method, VGCF (registered trademark)-H (Showa Denko K.K.) can be used.

When the slurry is used for forming a positive electrode, examples of the electrode active material include lithium cobaltate ($LiCoO_2$), lithium complex oxide containing nickel, spinel type lithium manganate ($LiMn_2O_4$), olivine type lithium iron phosphate, one or more kinds of chalcogen compounds such as $TiS_2$, $MnO_2$, $MoO_3$, and $V_2O_5$, and the like. Other alkali metal oxides may also be used. Examples of the lithium complex oxide containing nickel include a Ni—Co—Mn lithium complex oxide, a Ni—Mn—Al lithium complex oxide, and a Ni—Co—Al lithium complex oxide. Specific examples of the electrode active material include $LiNi_{1/3}Mn_{1/3}Co_{1/3}O_2$ and $LiNi_{3/5}Mn_{1/5}Co_{1/5}$.

<2-3. Aqueous Medium for Use in Slurry>

An aqueous medium used for the slurry can be the same as the aqueous medium used for polymerization of the copolymer for a binder (P). As the aqueous medium used for the slurry, the aqueous medium used for the polymerization of the copolymer for a binder (P) may be used as it is, an aqueous medium containing the aqueous medium used for the polymerization and another aqueous medium added in addition to that used for the polymerization may be used, or a new aqueous medium may be used.

<3. Electrodes for Non-Aqueous Batteries>

In the non-aqueous battery electrode of the present embodiment, an electrode active material layer containing an electrode active material and a copolymer for a binder (P) is formed on the surface of a current collector. For example, the electrode can be manufactured by coating the slurry on a current collector, drying the slurry to form an electrode active material layer, and then cutting the layer into an appropriate size.

Examples of current collectors used for electrodes include, but are not limited to, metals such as iron, copper, aluminum, nickel, stainless steel, and the like. The shape of the current collector is not particularly limited, but a sheet-like collector having a thickness of 0.001 to 0.5 mm is usually used.

The method for applying the slurry onto the current collector can be a general application method and is not particularly limited. Examples of the method include a reverse roll method, a direct roll method, a doctor blade method, a knife method, an extrusion method, a curtain method, a gravure method, a bar method, a dip method, and a squeeze method. Among these methods, the doctor blade method, the knife method, or the extrusion method is preferably used in view of the fact that the coating film is suitable for various physical properties such as viscosity and drying properties of the slurry used for the electrode of the non-aqueous battery and can be obtained in a good surface state.

The slurry may be applied to only one side of the current collector, or may be applied to both sides. When the slurry is applied to both sides of the current collector, one side may be applied sequentially, or both sides may be applied simultaneously. The slurry may be applied continuously or intermittently to the surface of the current collector. The thickness, length, and width of the coating film obtained by applying the slurry can be appropriately determined in accordance with the size of the battery. For example, it can be applied using a doctor blade so that the applied amount on one side after drying is 4 to 20 mg/cm$^2$ or 6 to 16 mg/cm$^2$.

The method of drying the applied slurry is not particularly limited, but for example, hot air, vacuum, (far) infrared, electron beam, microwave, and cold air may be used alone or in combination. The temperature at which the coated film is dried is usually in the range of 40 to 180° C., and the drying time is usually 1 to 30 minutes.

The current collector on which the electrode active material layer is formed is cut to have an appropriate size and shape as an electrode. The method of cutting the current collector in which the active material layer is formed is not particularly limited, but a slit, laser, wire cut, cutter, Thomson, or the like can be used.

The current collector on which the electrode active material layer is formed may be pressed as necessary before or after cutting. The electrode active material layer is firmly bonded to the current collector by pressing, and the non-aqueous battery can be made compact by thinning the electrode. As the pressing method, a general method can be used, and in particular, a die pressing method and a roll pressing method are preferably used. The pressing pressure is not particularly limited, but is preferably 0.5 to 5 t/cm$^2$ which is a range that does not affect the function of doping/de-doping the electrode active material with lithium ions or the like.

<4. Non-Aqueous Batteries>

In the non-aqueous battery according to the present embodiment, a positive electrode, a negative electrode, an electrolytic solution, and, if necessary, components such as separators are housed in an outer package, and an electrode manufactured by the above method is used for one or both of the positive electrode and the negative electrode. The shape of the electrode may be, for example, a laminate or a wound body, but is not particularly limited.

<4-1. Electrolyte>

A non-aqueous solution having ionic conductivity is used as the electrolyte. Examples of the solution include an organic solvent in which an electrolyte is dissolved and an ionic liquid.

As the electrolyte, an alkali metal salt can be used, and it can be appropriately selected according to the kind of the electrode active material or the like. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, lithium aliphatic carboxylates, and the like. Other alkali metal salts may also be used.

Examples of the organic solvent for dissolving the electrolyte include, but are not limited to, carbonate ester compounds such as ethylene carbonate (EC), propylene carbonate (PC), diethyl carbonate (DEC), methylethyl carbonate (MEC), dimethyl carbonate (DMC), fluoroethylene carbonate (FEC), vinylene carbonate (VC), nitrile compounds such as acetonitrile, and carboxylic acid esters such as ethyl acetate, propyl acetate, methyl propionate, ethyl propionate, and propyl propionate.

These electrolytes may be used alone or in combination of two or more.

<4-2. Outer Package>

As the outer package, a metal or an aluminum laminate material, or the like can be suitably used. The shape of the battery may be any of a coin type, a button type, a seat type, a cylindrical type, a square type, a flat type, and the like. The battery of this embodiment can be manufactured using a known producing method.

EXAMPLES

Examples and comparative examples of the copolymer for a binder (P), the negative electrode slurry, the electrode, and the battery will be described below in further detail.

The present invention is not limited thereto.

Example 1

(Preparation of Copolymer (P) for Binder (Binder))

As the monomer (A) represented by the general formula (1), N-vinylacetamide (NVA) (manufactured by Showa Denko K.K.) was used. As the (meth)acrylic acid monomer (B), sodium acrylate (AaNa) (prepared as a 28.5 mass % aqueous solution) was used. As the monomer (C) represented by the general formula (2), methoxy polyethylene glycol methacrylate (product name VISIOMER (registered trademark) MPEG 2005 MA W (prepared as a 50.0 mass % aqueous solution), manufactured by EVONIK INDUSTRIES) (In general formula (2), $R^3=CH_3$, $R^4=R^5=H$, $R^6=CH_3$, n=45, m=0.) was used. V-50 (2,2'-azobis(2-methylpropionamidine) dihydrochloride, manufactured by Wako Pure Chemical Industries, Ltd.) and ammonium persulfate (manufactured by Wako Pure Chemical Industries, Ltd.) were used as polymerization initiators.

A separable flask equipped with a cooling tube, thermometer, stirrer, and dropping funnel was charged with 10 parts by mass of NVA, 312.3 parts by mass of a 28.5% by mass aqueous AaNa solution (89 parts by mass of AaNa), 2 parts by mass of VISIOMER (registered trademark) MPEG 2005 MA W (1.0 part by mass of methoxy polyethylene glycol methacrylate), 0.2 parts by mass of V-50, 0.05 parts by mass of ammonium persulfate, and 678 parts by mass of water at 30° C. This was heated to 80° C. and polymerized for 4 hours. Thereafter, a binder composition Q1 containing 10.0 mass % (non-volatile content) of the copolymer for a binder P1 (Binder P1) as a non-volatile component was obtained. The weight-average molecular weight (equivalent of pullulan) of the copolymer for a binder P1 contained in the binder composition Q1 was measured. The non-volatile content, viscosity, and pH of the binder composition Q1 were measured, respectively, and are described in Table 2.

(Non-Volatile Content Measurement)

The non-volatile content of the binder composition was obtained by weighing 1 g of the sample in an aluminum dish having a diameter of 5 cm, drying at 130° C. for 1 hour while circulating air in a dryer at atmospheric pressure, and weighing the residue.

(Measurement of the Weight-Average Molecular Weight)

The weight-average molecular weight was determined using gel permeation chromatography (GPC) under the following conditions.

GPC equipment: GPC-101 (manufactured by Showa Denko K.K.)
Solvent: 0.1 M aqueous $NaNO_3$
Sample Column: Shodex Column Ohpak SB-806 HQ (8.0 mm I.D.×300 mm)×2
Reference Column: Shodex Column Ohpak SB-800 RL (8.0 mm I.D.×300 mm)×2
Column temperature: 40° C.
Sample concentration: 0.1 mass %
Detector: RI-71S (manufactured by Shimadzu Corporation)
Pump: DU-H2000 (manufactured by Shimadzu Corporation)
Pressure: 1.3 MPa
Flow rate: 1 ml/min
Molecular weight standard: Pullulan (P-5, P-10, P-20, P-50, P-100, P-200, P-400, P-800, P-1300, P-2500 (manufactured by Showa Denko K.K.))

(Viscosity Measurement)

The viscosity of the binder composition was calculated using a Brookfield viscometer (manufactured by Toki Sangyo Co., Ltd.) at a liquid temperature of 23° C., at a rotational speed of 10 rpm, and by using a No. 5, No. 6 or No. 7 rotor.

(Measurement of pH)

The pH of the binder composition was measured at a liquid temperature of 23° C. using a pH meter (manufactured by DKK-TOA Corporation).

(Preparation of Slurry for Negative Electrode)

Next, 81.6 parts by mass of SCMG (registered trademark)-XRs (manufactured by Showa Denko K.K.) as graphite, 14.4 parts by mass of silicon monoxide (SiO) (manufactured by Sigma-Aldrich), 1 part by mass of VGCF (registered trademark)-H (Showa Denko K.K.), 30 parts by mass of binder composition Q1 (3 parts by mass of the copolymer P1 for binder and 27 parts by mass of water), and 20 parts by mass of water were added, and the mixture was thickly kneaded using a stirring type mixer (rotary revolution stirring mixer) at 2000 rotations/minute for 4 minutes.

Further, 53 parts by mass of water was added and further mixed at 2000 revolutions per minute for 4 minutes to prepare a slurry for a negative electrode.

(Preparation of the Negative Electrode)

The negative electrode slurry was applied to one side of a copper foil having a thickness of 10 μm as a current collector by using a doctor blade so that the amount of application after drying was 8 mg/cm$^2$, heated and dried at 60° C. for 10 minutes, and then dried at 100° C. for 5 minutes to form an active material layer. The material made of the active material layer and the current collector was pressed at a press pressure of 1 t/cm$^2$ using a die press to obtain a negative electrode sheet.

The obtained negative electrode sheet was cut out to 22 mm×22 mm, and a negative electrode was manufactured by attaching a conductive tab.

(Preparation of the Positive Electrode)

A positive electrode slurry was prepared by mixing 90 parts by mass of $LiNi_{1/3}Mn_{1/3}Co_{1/3}O_2$, 5 parts by mass of acetylene black as a conductive auxiliary, and 5 parts by mass of polyvinylidene fluoride as a binder with 100 parts by mass of N-methylpyrrolidone.

The prepared slurry for the positive electrode was applied on an aluminum foil having a thickness of 20 μm as a current collector by a doctor blade method so that the thickness after the roll press treatment was 100 μm, dried at 120° C. for 5 minutes, and a positive electrode sheet was obtained through a press step. The obtained positive electrode sheet was cut out to 20 mm×20 mm, and a positive electrode was manufactured by attaching a conductive tab.

(Preparation of Battery)

In a mixed solvent of ethylene carbonate (EC), ethyl methyl carbonate (EMC), and fluoroethylene carbonate (FEC) in a volume ratio of 30:60: 10, $LiPF_6$ was dissolved at a concentration of 1.0 mol/L and vinylene carbonate (VC) was dissolved at a concentration of 1.0 mass % to prepare an electrolyte for use in a lithium ion secondary battery.

The active materials of the positive electrode and the negative electrode were housed in an aluminum laminate outer package (battery pack) so as to face each other through a separator made of a polyolefin-based porous film. An electrolyte was injected into the outer package and the outer package was packed with a vacuum heat sealer to obtain a laminate type battery.

TABLE 2

| | | | Examples | | | | | | |
|---|---|---|---|---|---|---|---|---|---|
| | | | 1 | 2 | 3 | 4 | 5 | 6 | 7 |
| Copolymer (P) | | Copolymer for a binder | P1 | P2 | P3 | P4 | P5 | P6 | P7 |
| | Monomer (A) (mass %) | N-vinylacetamide | 10.0 | 10.0 | 10.0 | 5.0 | 10.0 | 10.0 | 10.0 |
| | Monomer (B) (mass %) | Sodium acrylate | 89.0 | 85.0 | 80.0 | 90.0 | 80.0 | 80.0 | 85.0 |
| | | Acrylic acid | — | — | — | — | 5.0 | — | — |
| | Monomer (C) (mass %) | VISIOMER ®MPEG 2005 methoxypolyethylene glycol methacrylate (n = 45, molecular weight 2005) | 1.0 | 5.0 | 10.0 | 5.0 | 5.0 | 5.0 | — |
| | | VISIOMER ® MPEG 5005 methoxypolyethylene glycol methacrylate (n = 113, molecular weight 5005) | — | — | — | — | — | — | 5.0 |

TABLE 2-continued

|  |  |  |  |  |  |  |  |  |  |
|---|---|---|---|---|---|---|---|---|---|
|  | Monomer (D) (mass %) | 2-hydroxyethyl methacrylate | — | — | — | — | — | 5.0 | — |
|  | Monomer (E) (mass %) | Methoxypolyethylene glycol Methacrylate (n = 9, molecular weight 468) | — | — | — | — | — | — | — |
|  | Weight-average molecular weight (million) |  | 2.7 | 3.1 | 2.6 | 2.3 | 2.1 | 2.1 | 2.6 |
| Binder composition (Q) | Binder composition |  | Q1 | Q2 | Q3 | Q4 | Q5 | Q6 | Q7 |
|  | Non-volatile content (%) |  | 10.0 | 10.0 | 10.0 | 10.0 | 10.0 | 10.0 | 10.0 |
|  | Viscosity (mPa · s) |  | 24,000 | 22,000 | 16,000 | 25,000 | 21,000 | 22,000 | 23,000 |
|  | pH |  | 8.4 | 7.8 | 7.7 | 8.1 | 7.7 | 8.1 | 7.8 |
| Slurry | Slurry appearance (visual observation) |  | A | A | A | A | A | A | A |
|  | Content of Copolymer (P) with respect to total mass of active material and Copolymer (P) (mass %) |  | 3.0 | 3.0 | 3.0 | 3.0 | 3.0 | 3.0 | 3.0 |
| Electrode battery performance | Electrode appearance (whether presence of cracks, visual observation) |  | No | No | No | No | No | No | No |
|  | Peel strength (mN/mm) |  | 41 | 34 | 28 | 35 | 31 | 24 | 25 |
|  | Initial efficiency (%) |  | 84 | 84 | 84 | 83 | 84 | 83 | 84 |
|  | Discharge capacity retention (%) (25° C., 100 cycles) |  | 94 | 93 | 92 | 92 | 93 | 93 | 92 |

|  |  |  | Comparative Examples | | | | |
|---|---|---|---|---|---|---|---|
|  |  |  | 1 | 2 | 3 | 4 | 5 |
| Copolymer (P) | Copolymer for a binder |  | P8 | P9 | P10 | P11 | P12 |
|  | Monomer (A) (mass %) | N-vinylacetamide | 10.0 | 10.0 | 10.0 | — | 60.0 |
|  | Monomer (B) (mass %) | Sodium acrylate | 90.0 | 80.0 | 65.0 | 90.0 | 30.0 |
|  |  | Acrylic acid | — | — | — | — | — |
|  | Monomer (C) (mass %) | VISIOMER ®MPEG 2005 methoxypolyethylene glycol methacrylate (n = 45, molecular weight 2005) | — | — | 25.0 | 10.0 | 10.0 |
|  |  | VISIOMER ® MPEG 5005 methoxypolyethylene glycol methacrylate (n = 113, molecular weight 5005) | — | — | — | — | — |
|  | Monomer (D) (mass %) | 2-hydroxyethyl methacrylate | — | — | — | — | — |
|  | Monomer (E) (mass %) | Methoxypolyethylene glycol Methacrylate (n = 9, molecular weight 468) | — | 10.0 | — | — | — |
|  | Weight-average molecular weight (million) |  | 2.7 | 1.5 | 1.4 | 1.9 | 2.1 |
| Binder composition (Q) | Binder composition |  | Q8 | Q9 | Q10 | Q11 | Q12 |
|  | Non-volatile content (%) |  | 10.0 | 10.0 | 10.0 | 10.0 | 10.0 |
|  | Viscosity (mPa · s) |  | 25,000 | 14,000 | 8,000 | 18,000 | 11,000 |
|  | pH |  | 8.6 | 7.8 | 7.1 | 8.2 | 7.1 |
| Slurry | Slurry appearance (visual observation) |  | A | A | A | B | B |
|  | Content of Copolymer (P) with respect to total mass of active material and Copolymer (P) (mass %) |  | 3.0 | 3.0 | 3.0 | 3.0 | 3.0 |
| Electrode battery performance | Electrode appearance (whether presence of cracks, visual observation) |  | Yes | Yes | No | Non-coating | Yes |
|  | Peel strength (mN/mm) |  | 45 | 24 | 8 |  | 35 |
|  | Initial efficiency (%) |  | 84 | 83 | 77 |  | 75 |
|  | Discharge capacity retention (%) (25° C., 100 cycles) |  | 94 | 82 | 65 |  | 61 |

Examples 2 to 9 and Comparative Examples 1 to 5

The copolymers for a binder, P2 to P12, of Examples 2 to 9 and Comparative Examples 1 to 5 were prepared by the same method as in Example 1, using the monomers (A) to (E) described in Table 2.

In Example 7, methoxy polyethylene glycol methacrylate (product name VISIOMER (registered trademark) MPEG 5005 MA W (prepared as a 50.0 mass % aqueous solution), manufactured by EVONIK INDUSTRIES) (In formula (2), $R^3=CH_3$, $R^4=R^5=H$, $R^6=CH_3$, n=113, m=0.) was used as the monomer (C). In Example 6, 2-hydroxyethyl methacrylate (2 HEMA) was used as the monomer (D). In Comparative Example 2, methoxy polyethylene glycol methacrylate (In formula (2), $R^3=CH_3$, $R^4=R^5=H$, $R^6=CH_3$, n=9, m=0.) was used as the monomer (E).

<Method for Evaluating Examples and Comparative Examples>

The appearance of the slurry for the negative electrode, the electrode performance, and the battery performance of each example and comparative example were evaluated. The evaluation method is shown as follows, and the evaluation results are shown in Table 2.

(Slurry Appearance)

The external appearance was confirmed by visual observation, and the size and masses of the aggregates were measured with a micrometer. In 10 g of the slurry, when there were 1 or more lumps having a maximum dimension of 1 mm or more ($27\ mm^3$ or greater), it was judged as B, and in other cases, it was judged as A.

(Appearance of the Negative Electrode)

The external appearance was confirmed by visual observation of the electrode, and the case where 3 or more cracks were observed on the surface of the electrode of 5 cm×20 cm was judged as B, and the case where 2 or fewer cracks were observed was judged as A.

(Peel Strength of the Negative Electrode Active Material Layer)

At 23° C., the active material layer formed on the current collector of the negative electrode and the SUS plate were bonded together using a double-sided tape (NITTOTAPE (registered trademark) No 5, manufactured by Nitto Denko Corporation), and a value obtained by peeling at a peeling width of 25 mm and a peeling speed of 100 mm/min by 180° was defined as peel strength.

(Battery Performance)
(Initial Efficiency)

In order to measure the capacity of the battery, the battery in which the electrolyte was injected was charged by CC-CV charge (charged at CC (constant current, 0.2 C) until it reached the upper voltage limit (4.2 V), then charged at CV (constant voltage, 4.2 V) until it reached 1/20 C) under the condition of 25° C., and after standing for 30 minutes, CC discharge (discharge at CC (0.2 C) until it reached the lower voltage limit (2.75 V)) was performed. The charging and discharging were performed for five cycles, and the initial efficiency was calculated by the following equation [1] using the average of the discharge capacities in the subsequent two cycles as the initial capacity.

$$\text{Initial Efficiency (\%)} = \text{Initial Capacity/Theoretical Capacity} \times 100 \quad [1]$$

The theoretical capacity is a value obtained by the following equation: weight per area [$g/cm^2$] of the positive electrode×area [$cm^2$] of the positive electrode active material layer×capacity [mAh/g] of the positive electrode active material×content of the positive electrode active material in the positive electrode active material layer.

(Charge and Discharge Cycle Characteristics)

The battery charge-discharge cycle test was conducted under the condition of 25° C. by CC-CV charging (charged at CC (1C) until it reached the upper voltage limit (4.2 V), then charged at CV (4.2 V) until it reaches 1/20 C). After 30 minutes of standing, CC discharge (discharged at CC (1C) until it reached the lower voltage limit (2.75 V)) was performed. This operation was repeated. The charge-discharge high-temperature cycle characteristics of the battery were measured by the capacity retention rate, that is, the percentage of the discharge capacity of the 100th cycle with the respect to that of the 1st cycle. A battery having a capacity retention rate of 90% or more has a good charge-discharge cycle characteristics.

<Evaluation Results of Examples and Comparative Examples>

From Table 2, in Examples 1 to 7, the appearance of the negative electrode is good, and the peel strength (mN/mm) of the negative electrode active material layer also shows a sufficient value. In addition, the discharge capacity retention of the charge-discharge cycle characteristics of the battery is sufficiently high.

On the other hand, in Comparative Example 1 using no monomer (C) and Comparative Example 2 using methoxy polyethylene glycol methacrylate having a smaller n number than that of the monomer (C), cracks were observed in the prepared electrode. In Comparative Example 3 using an excessive amount of monomer (C), the charge-discharge cycle characteristics of the battery were low. In Comparative Example 4 without using the monomer (A), lumps having a maximum dimension of 1 mm or more were observed in the slurry. Further, the electrode could not be coated flatly, and the performance evaluation as a battery was impossible.

In Comparative Example 5 in which the monomer mixture (M) contains an excess of NVA, lumps having a maximum dimension of 1 mm or more were observed in the slurry. Also, a crack was observed in the prepared electrode. And, charge and discharge cycle characteristics as a battery were low.

As a result of the above evaluation, the negative electrode active material layer obtained by coating the collector with a slurry containing the binder and the negative electrode active material of the embodiment and drying the slurry has no problem in appearance, has a sufficient peel strength between the negative electrode active material layer and the collector, and can sufficiently enhance the charge-discharge cycle characteristics of the battery.

Therefore, by using the copolymer for a binder according to the present embodiment as the binder for the negative electrode of the non-aqueous battery, it has been found that good charge-discharge cycle characteristics can be obtained for the battery while securing sufficient bonding between the negative electrode active materials in the negative electrode of the non-aqueous battery and between the negative electrode active materials and the current collector.

Further, these binders can be used as binders for the positive electrode of a non-aqueous battery, and a battery having good charge-discharge cycle characteristics can be manufactured while securing sufficient bonding properties between the positive electrode active materials and between the positive electrode active materials and the current collector.

The invention claimed is:

1. A copolymer for a binder for a non-aqueous battery electrode, which is a copolymer (P) of a monomer mixture (M) comprising:
   a monomer (A) represented by general formula (1);
   a (meth)acrylic acid monomer (B); and
   a monomer (C) represented by general formula (2),
   wherein a content of a structure derived from the monomer (A) in the copolymer (P) is 0.5 to 20.0 mass %, a content of a structure derived from the (meth)acrylic acid monomer (B) in the copolymer (P) is 60.0 to 98.5 mass %, and a content of a structure derived from the monomer (C) in the copolymer (P) is 0.5 to 20.0 mass %,

[Chemical Formula 1]

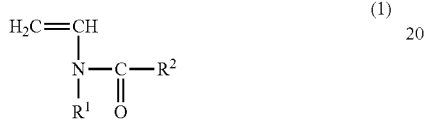

(1)

wherein $R^1$ and $R^2$ each independently represent a hydrogen atom or an alkyl group having 1 to 5 carbon atoms,

[Chemical Formula 2]

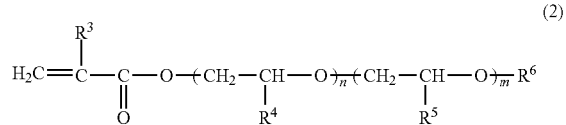

(2)

wherein $R^3$, $R^4$, $R^5$, and $R^6$ each independently represent a hydrogen atom or an alkyl group having 1 to 5 carbon atoms, and n is an integer of 1 or more, m is an integer of 0 or more, and $(n+m) \geq 20$.

2. The copolymer for a binder for a non-aqueous battery electrode according to claim 1, wherein in the general formula (2), $(n+m) \leq 500$.

3. The copolymer for a binder for a non-aqueous battery electrode according to claim 1, wherein in the general formula (2), $(n+m) \geq 30$.

4. The copolymer for a binder for a non-aqueous battery electrode according to claim 1, wherein the monomer mixture (M) further comprises an ethylenically unsaturated monomer (D) having a polar functional group.

5. The copolymer for a binder for a non-aqueous battery electrode according to claim 1, wherein the monomer (A) is N-vinylformamide or N-vinylacetamide.

6. The copolymer for a binder for a non-aqueous battery electrode according to claim 1, wherein the weight-average molecular weight is in the range of 1,000,000 to 10,000,000.

7. The copolymer for a binder for a non-aqueous battery electrode according to claim 4, wherein a content of a structure derived from the monomer (D) is 0.5 to 60.0 mass % in the copolymer (P).

8. A slurry for producing a non-aqueous battery electrode, the slurry comprising:
   the copolymer for a binder for a non-aqueous battery electrode according to claim 1;
   an electrode active material; and
   an aqueous medium.

9. The slurry for producing a non-aqueous battery electrode according to claim 8, wherein the electrode active material is a negative electrode active material.

10. The slurry for producing a non-aqueous battery electrode according to claim 8, wherein a content of the copolymer (P) is 0.1 to 5.0 mass % with respect to total mass of the electrode active material and the copolymer (P).

11. A non-aqueous battery electrode, comprising:
    a current collector; and
    an electrode active material layer formed on a surface of the current collector,
    wherein the electrode active material layer comprises
    the copolymer for a binder for a non-aqueous battery electrode according to claim 1, and
    an electrode active material.

12. The non-aqueous battery electrode according to claim 11, wherein the electrode active material is a negative electrode active material.

13. A non-aqueous battery comprising the non-aqueous battery electrode according to claim 11.

* * * * *